(12) United States Patent
Magganmane et al.

(10) Patent No.: US 10,469,287 B2
(45) Date of Patent: Nov. 5, 2019

(54) PORT TRANSLATION FOR NETWORK SEGMENTATION

(71) Applicant: ColorTokens, Inc., Santa Clara, CA (US)

(72) Inventors: Harish Magganmane, San Jose, CA (US); Ravi Voleti, Fremont, CA (US); Ashish Trivedi, Fremont, CA (US); Deepak Mohanty, Fremont, CA (US); Charles Kuta, Los Gatos, CA (US); Anoop Kapoor, San Jose, CA (US); Pankaj Parekh, Santa Clara, CA (US)

(73) Assignee: COLORTOKENS, INC. CA (US)

( * ) Notice: Subject to any disclaimer, the term of this patent is extended or adjusted under 35 U.S.C. 154(b) by 184 days.

(21) Appl. No.: 15/793,336

(22) Filed: Oct. 25, 2017

(65) Prior Publication Data

US 2019/0123934 A1   Apr. 25, 2019

(51) Int. Cl.
*H04L 12/46* (2006.01)
*H04L 29/06* (2006.01)
*H04L 29/12* (2006.01)
*H04L 12/931* (2013.01)

(52) U.S. Cl.
CPC ........ *H04L 12/467* (2013.01); *H04L 12/4641* (2013.01); *H04L 61/2514* (2013.01); *H04L 61/2517* (2013.01); *H04L 61/6063* (2013.01); *H04L 63/0428* (2013.01); *H04L 49/354* (2013.01); *H04L 63/20* (2013.01)

(58) Field of Classification Search
None
See application file for complete search history.

(56) References Cited

U.S. PATENT DOCUMENTS

| 2012/0331300 | A1* | 12/2012 | Das | H04L 69/164 713/176 |
| 2015/0036682 | A1* | 2/2015 | Atkinson | H04L 29/12367 370/386 |
| 2017/0214652 | A1* | 7/2017 | Paunikar | H04L 29/12367 |
| 2018/0062881 | A1* | 3/2018 | Chandrashekhar | G06F 15/177 |

* cited by examiner

*Primary Examiner* — Chirag G Shah
*Assistant Examiner* — Amarnauth G Persaud
(74) *Attorney, Agent, or Firm* — Barry Choobin; Patent 360 LLC (57) ABSTRACT

Described herein are systems, methods, and software to enhance gateway security for multiple communication groups. In one implementation, a method of operating a gateway service includes identifying a data packet received from a first computing system, wherein the data packet comprises a first destination port value. The method further includes, identifying a group identifier within the data packet, wherein the group identifier associated with a communication group of the plurality of communication groups, translating the first destination port value to a second destination port value based on the group identifier, and forwarding the data packet with the translated second destination port value.

11 Claims, 7 Drawing Sheets

| COMMUNICATION GROUP 410 | DESTINATION PORT VALUES 420 |
|---|---|
| GROUP 440 | PORT VALUE 450 |
| GROUP 441 | PORT VALUE 451 |
| GROUP 442 | PORT VALUE 452 |
| GROUP 443 | PORT VALUE 453 |

PORT TRANSLATION FOR NETWORK SEGMENTATION

BACKGROUND

In computing networks, computing systems, both real and virtual, often include applications and services that require communications with other computing systems to provide desired operations. For example, an application on a first computing system may require data from a database located on a second computing system. Consequently, to provide the communication, the data payload may be placed in a network packet, and transferred to the required computing system. However, although network packets provide a method of communication between computing systems, difficulties often arise in managing security between the computing systems.

To overcome some of the deficiencies presented in securing network communications between computing systems, various technologies have been developed. These technologies include virtual local area networks (VLANs), encryption for the data payload within the data packets, amongst other similar security procedures. Yet, while the security technologies currently deployed may provide additional security over unprotected networks, managing the deployment of the security technologies can often be difficult and cumbersome. Further, providing a cohesive inter-computing system security policy may be difficult without modifying the applications on the computing systems, and/or the configurations provided by switches, firewalls, routers, gateways, and other similar networking devices providing the connectivity to the computing systems.

OVERVIEW

The technology disclosed herein enhances security in inter-computing system communications by limiting the number of open ports on a computing system. In one implementation, a gateway service for a plurality of communication groups identifies a data packet received from a first computing system, wherein the data packet comprises a first destination port value. In response to identifying the data packet, the gateway service identifies a group identifier within the data packet, wherein the group identifier is associated with a communication group of the plurality of communication groups, and the first destination port value to a second destination port value based on the group identifier. Once translated, the gateway service replaces the first destination port value with the second destination port value in the data packet, and forwards the data packet with the second destination port value to a gateway associated with the communication group.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for managing data communications between computing systems. In particular, computing systems, both real and virtual, include various applications that often require communication with other computing systems to provide desired operations. For example, in an organization's computing network, a service application on a first computing system may require communications with a database on a second computing system. To provide this communication, a network packet may be generated at the first computing system in response to a communication request from the application and the packet may be transferred to the second computing system, wherein the network packet may include a header portion with addressing and protocol information and a payload portion that includes the data for the application.

Here, to improve the security of communications between computing systems, a computing system that is required to communicate with one or more other computing systems may be configured with a communication service that can identify and manage communications with the other computing systems. In a particular example, as a communication request is generated from an application on a computing system, rather than forwarding the communication to the Transmission Control Protocol/Internet Protocol (TCP/IP) portion of the operating system or other software element of the computing system, the packet may be forwarded to a communication service. This communication service, which may operate as part of or alongside the operating system, may determine whether the communication is permitted, and if permitted, configure a network packet for delivery to a second computing system with the data payload for the application and at least private addressing information to secure the communication.

In at least one example, the private addressing information may include at least a source private address for the application and, in some implementations, a destination private address for the destination application, a source port, a destination port, or some other similar private addressing information. In including the private addressing information, applications on the computing system may be provided with their own private or overlay network addressing, permitting the application to communicate with other applications (on supporting computing systems) that share the overlay network. An overlay network is a private network that is built on top of another network (sometimes referred to as an underlay network).

Once the application is allocated to an overlay network, the application may address other applications on the network using the private addressing information associated with the overlay network, wherein the communications are identified at a virtual network interface provided by the communication service. Once the request is received, the service may identify destination information (overlay network destination information) for the requested communication, and determine whether the communication is permitted. Once permitted, the service may identify public addressing information for addressing the destination computing system on the underlay network, and generate a packet that can be transferred to the second computing system. This packet may include an encrypted portion for the application data with the private addressing information (overlay addressing information), and include a non-encrypted portion with the public addressing information (underlay addressing information) and group identifier information for the requesting application.

The group identifier information is used by the destination computing system in determining how to process a received packet. In particular, the group identifier information may include a revision associated with the service, a group corresponding to the requesting application (i.e. an identifier that permits defined applications to communicate), and other relevant information to decrypt the payload of the packet. This information for decrypting the packet may include information about the length of the encrypted data payload, information about the sequence number of the packet, a keyed-hash message authentication code (HMAC), a peer identifier (peerID), an initialization vector (IV) or seed, or some other similar information, including combinations thereof. Based on the group identifier information, the receiving computing system may determine whether the packet is permitted (e.g. whether the packet can be decrypted and supplied to an associated application), or whether the communication should be blocked from being provided to the associated application.

In the present implementation, to communicate with a second computing system, the secure data packets may be required to be transferred over a gateway service that acts as an intermediary between computing systems. In particular, because of firewall implementations for the computing systems, communications may be incapable of being directly routed to the second computing system. Instead the communications, may be routed to a gateway service executing on another computing system, which in turn forwards the communication to the destination computing system. Here, because computing systems within a computing network may belong to a plurality of communication groups, each of the communication groups may be required to maintain a separate gateway (executing as an application or service) on the gateway service system. In providing the separate gateways, the gateways may be implemented on the same computing system, wherein each of the gateways may be associated with a particular destination port. To limit the number of ports that are required to be opened for each of the gateways, a port translation service may be provided, wherein each computing system of the computing network may communicate with the computing system using the same port. Once received, the port translation service may translate the destination port to the appropriate communication group gateway port, and forward the packet to the gateway. Advantageously, this limits the number of ports that are open on the gateway service computing system, while maintaining the ability for each gateway of the plurality of gateways to be contacted by computing systems associated with the communication group.

Figure 1:
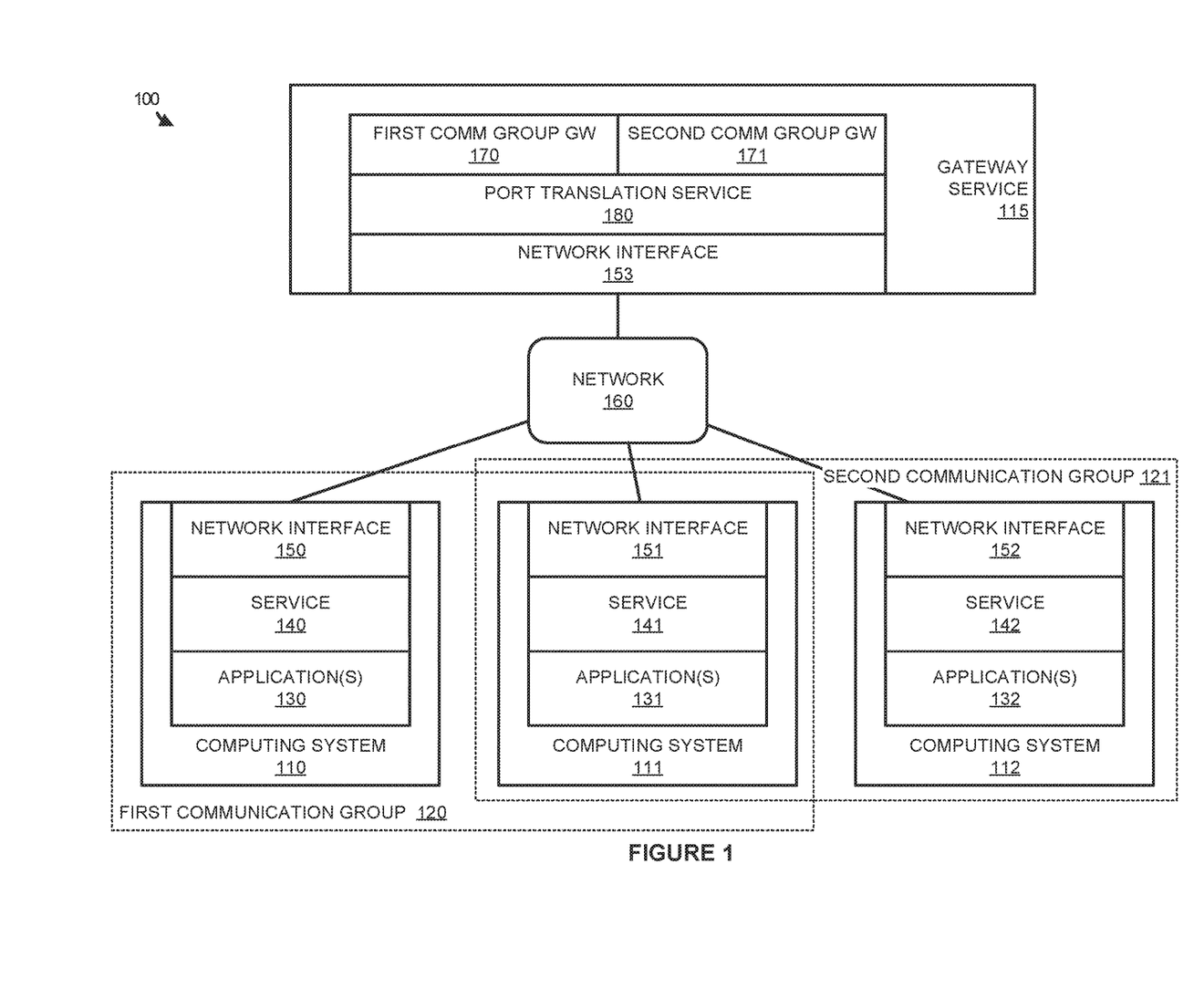
FIG. 1 illustrates a computing network for inter-computing system communication according to an implementation.

FIG. 1 illustrates a computing network 100 for inter-computing system communication according to an implementation. Computing network 100 includes network 160 that facilitates the communications between gateway service 115 and computing systems 110-112. Gateway service 115 further includes communication group gateways 170-171, port translation service 180, and network interface 153. Computing systems 110-112 further include applications 130-132, services 140-142, and network interfaces 150-152.

In operation, computing systems 110-112 execute applications 130-132 to provide various operations including data processing, front-end management, image or video editing, productivity, or some other similar type of operation. To permit the applications to communicate with other computing systems and other approved applications, each of the systems includes services 140-142, which are used to identify communications, determine whether the communications are permitted, and generate secure packets for transfer to the destination computing system. In determining whether communications are permitted, computing systems 110-112 may communicate with a configuration service to obtain permissions for the applications on the computing system. In at least one example, a user of the computing system may provide credentials, such as a username and password, which are then provided to the configuration service. In response to the request, the configuration service will identify permissions associated with credentials and provide the permissions to the corresponding service to manage communications on the devices.

In some implementations, the permissions information that is provided by the configuration service may define which computing systems and applications thereon that each computing system may communicate with. As an example, an application on computing system 110 may communicate with an application on computing system 111 because the computing systems are on the same communication group. However, an application on computing system 110 may be incapable of communicating with an application on computing system 112 because they do not share a communication group.

In the present example, to facilitate the communication between computing systems, gateway service 115 is provided. Gateway service 115 is used as an intermediary to direct communications between computing systems 110-112. For example, when computing system 110 requires a communication with computing system 111, the computing systems may be incapable of directly communicating with one another (e.g. a destination port may not be open on the destination computing system to support the communication). Instead, when a communication is directed at computing system 111, the communication may be delivered gateway service 115 and forwarded to first communication group gateway 170, wherein first communication group gateway 170 may be responsible for identifying addressing for computing system 111 and forwarding the communication to the destination computing system. However, to support multiple communication group gateways, such as the configuration in computing network 100, port translation service 180 is provided that is used to direct incoming data packets to their corresponding gateway of communication group gateways 170-171.

Figure 2:
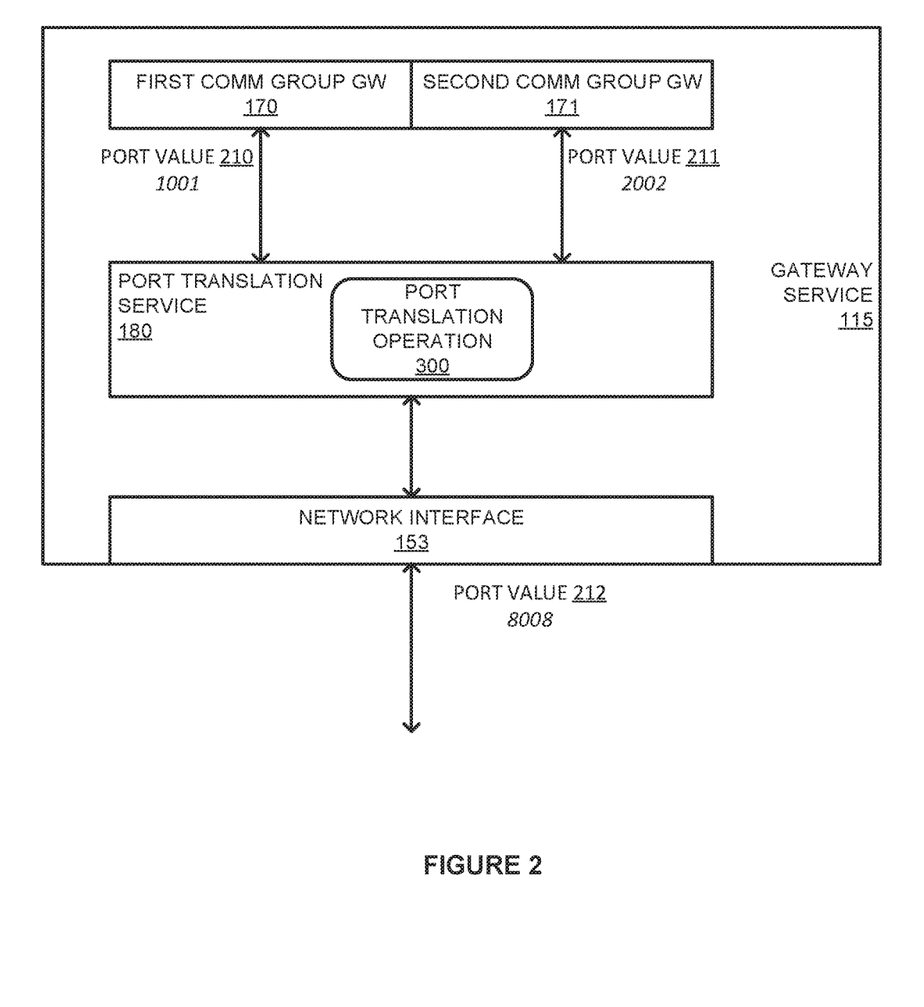
FIG. 2 illustrates a gateway service for multiple communication groups according to an implementation.

To further illustrate the operations of gateway service 115, FIG. 2 is provided. FIG. 2 illustrates a gateway service 115 for multiple communication groups according to an implementation. Gateway service 115 includes the elements from computing network 100 of FIG. 1, and further includes port values 210-212.

As described herein, in some implementations, to facilitate the communication between computing systems of the same communication group, a gateway service may be employed that acts as an intermediary to facilitate the communications. In providing the service, computing systems in the computing network may provide an outgoing communication to gateway service 115 to open a port for communication with gateway service 115. Once the port is opened, the computing system may use gateway service 115 to provide communications with other computing systems available via the communication groups.

Figure 3:
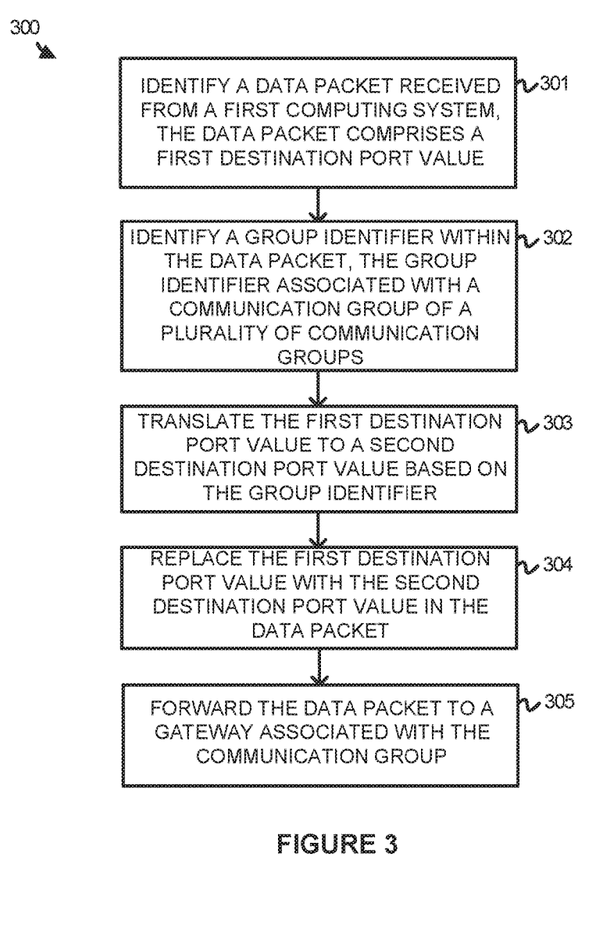
FIG. 3 illustrates a port translation operation according to an implementation.

In the present implementation, gateway service 115 includes port translation service 180 (allocated port value 212), which included to provide port translation operation 300 further described in FIG. 3. In providing port translation operation 300, each of the computing systems that are part of computing network 100 may address gateway service 115 using the same port identifier. In this manner, rather than opening a port for each of the gateways, a single port may be used by all of the communication groups, which is then forwarded to the appropriate gateway of communication group gateways 170-171. As an illustrative example, when an application on computing system 110 attempts to communicate with a second application on computing system 111, the communication service on computing system 110 (service 140) may generate a packet that is communicated over network 160 to be received at gateway service 115. In generating the packet, the packet may include encrypted private addressing information (used by the application in requesting the communication), group identifier information that can be used in identifying the communication group and decrypting the packet, and public addressing information that is associated by the underlay network in directing the communication over network 160. The private addressing information is associated with the overlay network for the application, and is different than the public addressing that is associated with the underlay network and network interface for the computing system. Accordingly, while the application on computing system 110 may direct a packet at a first internet protocol (IP) address associated with the second application on computing system 111, service 140 may be responsible for encapsulating the private addressing used by the application in a data packet that uses public addressing associated with network interface 150. In this particular example, when the communication is identified by the service, the service may generate public addressing that is used to forward the communication to gateway service 115, wherein the public addressing may include a source IP address associated with computing system 110, a destination IP address associated with gateway service 115, a source port address associated with service 140, and a destination port address (port value 212) associated with port translation service 180.

Once the packet is generated and communicated to gateway service 115, the packet is identified by port translation service 180, wherein port translation service 180 may identify a communication group associated with the packet. Once the communication group is identified, based at least in part on a group identifier in the packet, port translation service 180 may modify the packet as required for the gateway associated with the communication group. Referring to the example of the packet from computing system 110 to computing system 111, port translation service 180 may identify that the packet is associated with first communication group 120, and modify the packet to be provided to first communication group gateway 170. Once provided, first communication group gateway 170 may process the packet to determine whether the packet is permitted to be forwarded to a destination computing system, and may modify the packet (such as addressing in the packet) to forward the packet to the destination computing system.

FIG. 3 illustrates a port translation operation 300 according to an implementation. Port translation operation 300 is described parenthetically in the paragraphs that follow with reference to systems and elements of computing network 100 of FIG. 1 and the expanded view of gateway service 115 of FIG. 2.

As depicted, port translation operation 300 includes identifying (301) a data packet received from a first computing system, wherein the data packet comprises a first destination port value. In identifying the data packet, gateway service 115 may be used as a shared system that provides gateway operations for a plurality of communication groups. In particular, because computing systems may be incapable of directly communicating with one another, often due to firewall configurations, the computing systems may use the gateways as an intermediary for their communications. Thus, as an example, when an application operating on computing system 112 attempts to communicate with an application on computing system 111, the communication may be identified by communication service 142 on computing system 112. This communication service may be used to encapsulate the data for the application along with private addressing information associated with the application in an encrypted portion of a data packet. This private addressing information is used by the application to communicate with applications on other computing systems, and may comprise source and destination private IP addresses and private source and destination ports associated with the applications. In addition to the encrypted portion of the data packet, service 142 is also responsible for generating the non-encrypted portion of the packet, wherein the non-encrypted portion includes public or underlay addressing information associated with network interface 152, and group identifier information that is used to provide a group identifier and supplementary information to decrypt the data packet. In the present implementation, to facilitate the communication between computing system 112 and computing system 111, service 142 will direct the packet to gateway service 115, wherein directing the packet to the gateway service may include providing a destination IP address for the gateway service 115 and a destination port associated with port translation service 180 as part of the public addressing information.

Once the packet is received from computing system 112 and identified by port translation service 180, port translation service 180 will identify (302) a group identifier within the data packet, wherein the group identifier is associated with a communication group of a plurality of communication groups. As depicted in FIGS. 1 and 2 gateway service 115 may be configured such that it supports multiple gateways for multiple communication groups. In particular, first communication group gateway 170 may support the forwarding of communications for first communication group 120 and second communication group gateway 171 may support the forwarding of communications for second communication group 121. In identifying the communication group associated with a particular data packet, port translation service 180 may perform packet inspection to identify a group identifier in the packet. Once the group identifier is determined, port translation operation 300 may translate (303) the first destination port value to a second destination port value based on the group identifier. Referring to the example in FIG. 2, while the computing systems of the computing network may address gateway service 115 using a single port associated with port translation service 180, each of the gateways may use a different port value to process the packets. As a result, after translating the destination port value to a second destination port value, port translation operation 300 may replace (304) the first destination port value with the second destination port value in the data packet, and forward (305) the data packet to a gateway associated with the communication group.

Referring again to the example packet from computing system 112, the data packet may be inspected to identify a communication group associated with the data packet, which in this example would correspond to second communication group 121. As a result, the destination port for the packet, which was originally provided with port value 212, may be replaced with port value 211 associated with second communication group gateway 171. In this manner, rather than requiring a separate port to be open for each of the gateways operating on gateway service 115, which can lead to security risks on the gateway service, port translation service 180 may be used to provide a single available port to all of the communication groups.

Although demonstrated in the example of FIG. 3, as receiving a packet from a computing system, it should be understood that similar operations may be applied to outgoing packet as they are transferred to other computing systems. For example, a packet that is destined for an application on computing system 110 from first communication group gateway 170 may include port value 210. As a result, when the egress packet is identified by port translation service 180, the service may translate port value 210 to port value 212 prior to providing the packet to the destination computing system. In another example, when a packet is identified from second communication group gateway 171, port translation service 180 may be used to translate the port value 211 to port value 212 prior. In this manner, multiple communication groups may share the same port in communicating with required end computing systems.

Figure 4:
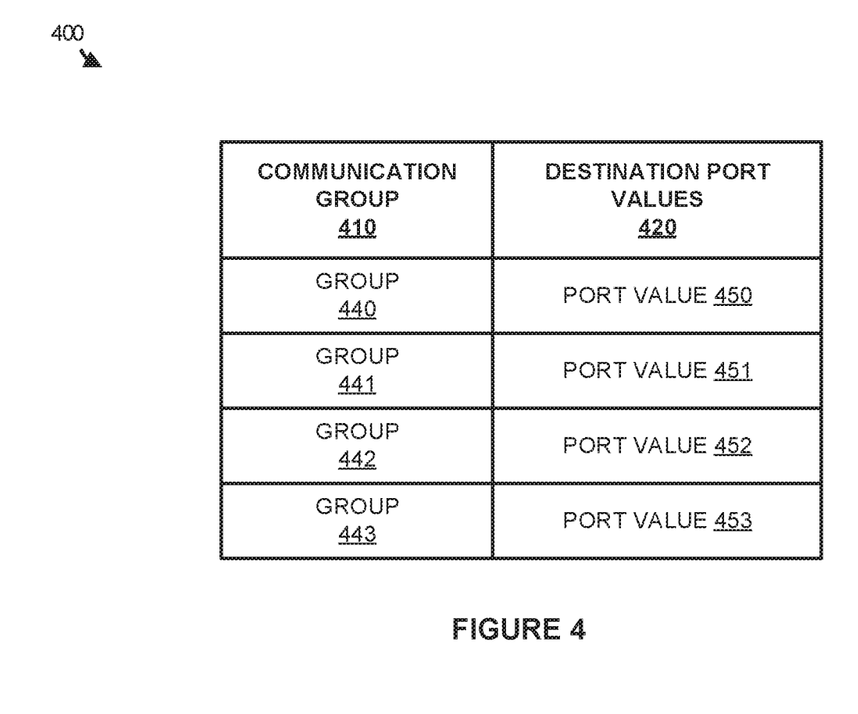
FIG. 4 illustrates a data structure to maintain correlations between communication group identifiers and port values according to an implementation.

FIG. 4 illustrates a data structure 400 to maintain correlations between communication group identifiers and port values according to an implementation. Data structure 400 is representative of a data structure that may be maintained by a port translation service on a gateway service system to forward packets to the appropriate gateway. Data structure 400 incudes columns for communication groups 410 and destination port values 420. The column for communication groups 410 includes groups 440-443, which are representative of communication groups that execute a gateway on the gateway service system. The column for destination port values 420 includes port values 450-453, which are representative of destination port values used in routing communications to the appropriate gateway.

As described herein, when computing systems that belong to the same communication group require a communication, the computing systems may be required to communicate over a gateway that acts as an intermediary for the communications. In the present example, multiple gateways may share the same gateway service system. To support this operation, while minimizing the number of ports that are required to be opened on the gateway service system, a port translation service may be provided, wherein the port translation service may receive packets on an open port available to the communication groups and forward the packets to the appropriate gateway using secondary port values.

In particular, to provide the forwarding operations, the port translation service may receive packets for the multiple communication groups at a first open destination port. As a packet is received and identified, the port translation service will inspect the packet to identify a group identifier within the packet. This identifier may comprise one or more bits of the packet that specify a communication group associated with the packet. Once the communication group is identified, data structure 400 may be used in identifying the appropriate destination port and gateway for the communication.

As an example, using data structure 400, a packet may be received with a group identifier that corresponds to group 441. Accordingly, based on the group identifier, port value 451 may be used to replace the original destination port in the packet and forward the packet to the corresponding gateway where the packet may be processed and communicated to the appropriate destination computing system.

Although demonstrated in the present example as using a table to provide the association between the communication groups and the port values, it should be understood that other data structures may be used in managing the associations. These data structures may include one or more arrays, linked lists, data trees, tables, or some other similar data structure, including combinations thereof.

Figure 5:
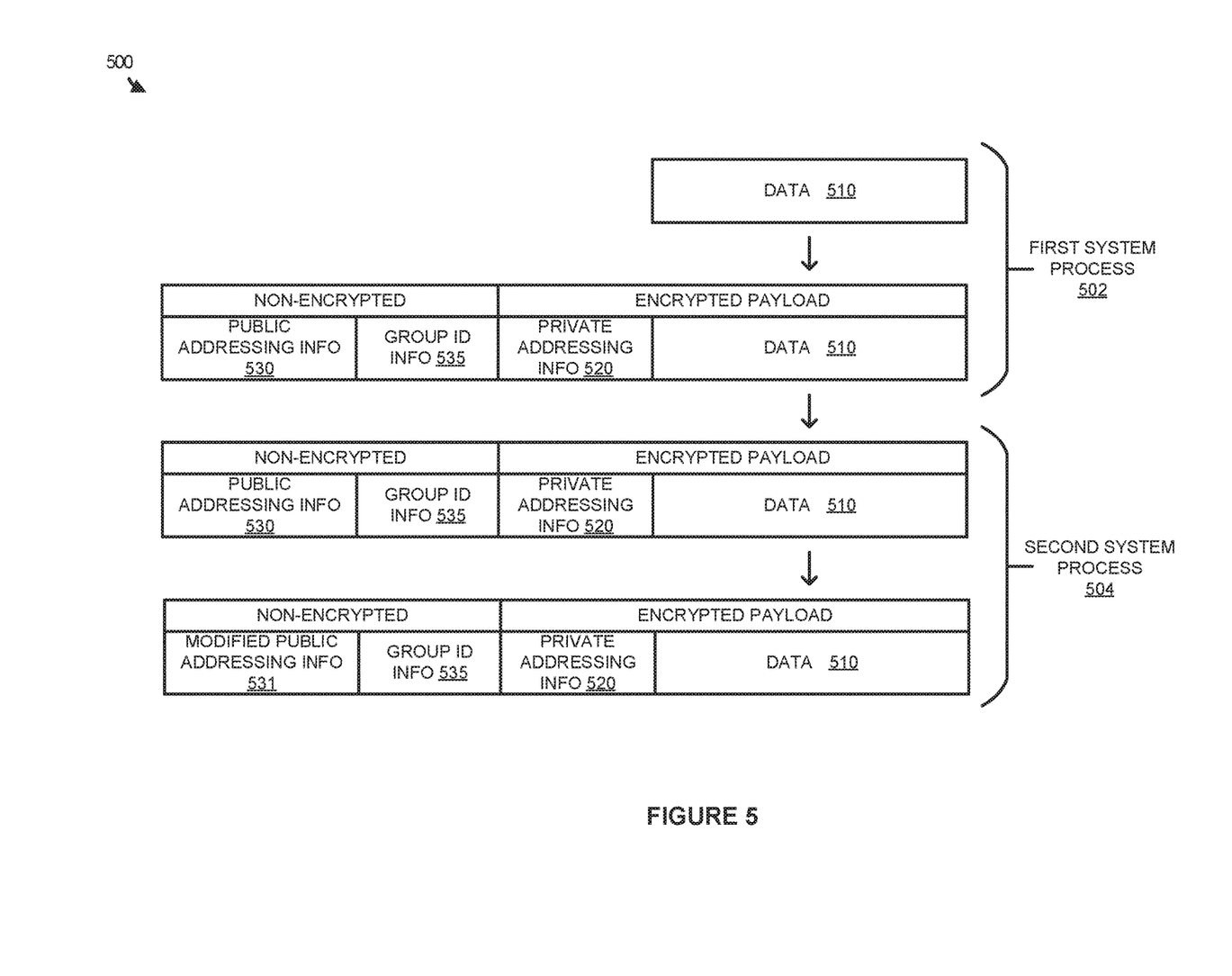
FIG. 5 illustrates an overview of packet management to provide a secure packet communication according to an implementation.

FIG. 5 illustrates an overview 500 of packet management to provide secure packet communication according to an implementation. Overview 500 includes first system process 502 that is representative of operations that may be provided on a first computing system, such as computing system 110, and second system process 504 that is representative of operations that may be provided by a gateway service, such as gateway service 115. Overview 500 further includes data 510, private addressing information 520, group identifier (ID) information 535, public addressing information 530, and modified public addressing information 531.

In the present implementation, when an application requires a communication, the application may provide data 510, which is identified by a communication service executing on the computing system. In particular, the application may be allocated to a communication group, wherein the communication group may communicate via an overlay addressing scheme with other applications and computing systems allocated to the communication group. For example, in an organization, finance applications may be configured such that they can communicate with one or more computing systems that also belong to the finance group.

Once a communication request is received with the application data, the communication service may process the request to generate a data packet to support the communication request. In some examples, the application may provide private addressing information associated with the private network or overlay network associated with the application. Based on the private addressing information, the communication service may determine if the communication is permitted and generate the packet with private addressing information 520 (provided at least in part from the application), group ID information 535 and public addressing information 530. Private addressing information 520 may include private source and destination IP addresses, private source and destination ports, a communication protocol, or some other similar information for the data packet. Group identifier information 535 may include various information that can be used in verifying and decrypting the packet. In some examples, this information may include a group identifier associated with the communication group for the application, a service version identifier associated with the communication service, as well as other attributes associated with the encrypted portion of packet. Public addressing information 530, which is also included in the non-encrypted portion of the packet is also used in routing the communication between computing systems. In particular, the public addressing information may include source and destination IP addresses associated with an underlay network connection for the computing systems, the ports that the services communicate over, and a protocol for the communication. These addresses and ports are different than the private addresses that are used by the applications on the computing system. Further, in the present implementation, the public addressing information may be used to route the communication to a gateway service, which is used as an intermediary in transferring the communication to the desired destination computing system, whereas the private addressing may be directed at routing the communication on the overlay or private network. Thus, the private addressing information may be used in providing information about the source and destination applications (e.g. source/destination IP addresses and ports corresponding to the applications), while the public addressing may be used in routing the packet between the computing systems and gateway services on the underlay network.

Once the packet is generated and transferred to the gateway service, the gateway service may process the packet as described herein. In particular, second system process 504 may identify a group identifier within the data packet, and modify the destination port in the public addressing to support the required gateway. In providing this operation, computing systems and applications that belong to different communication groups may share the same gateway service by addressing the gateway service using the same public (overlay) destination IP address and public destination port value. Once received, second system process 504 will identify the group identifier within the unencrypted portion and modify the public destination port value within the packet to create modified public addressing information 531. The packet with the modified public addressing information 531 is then provided to the service.

Figure 6:
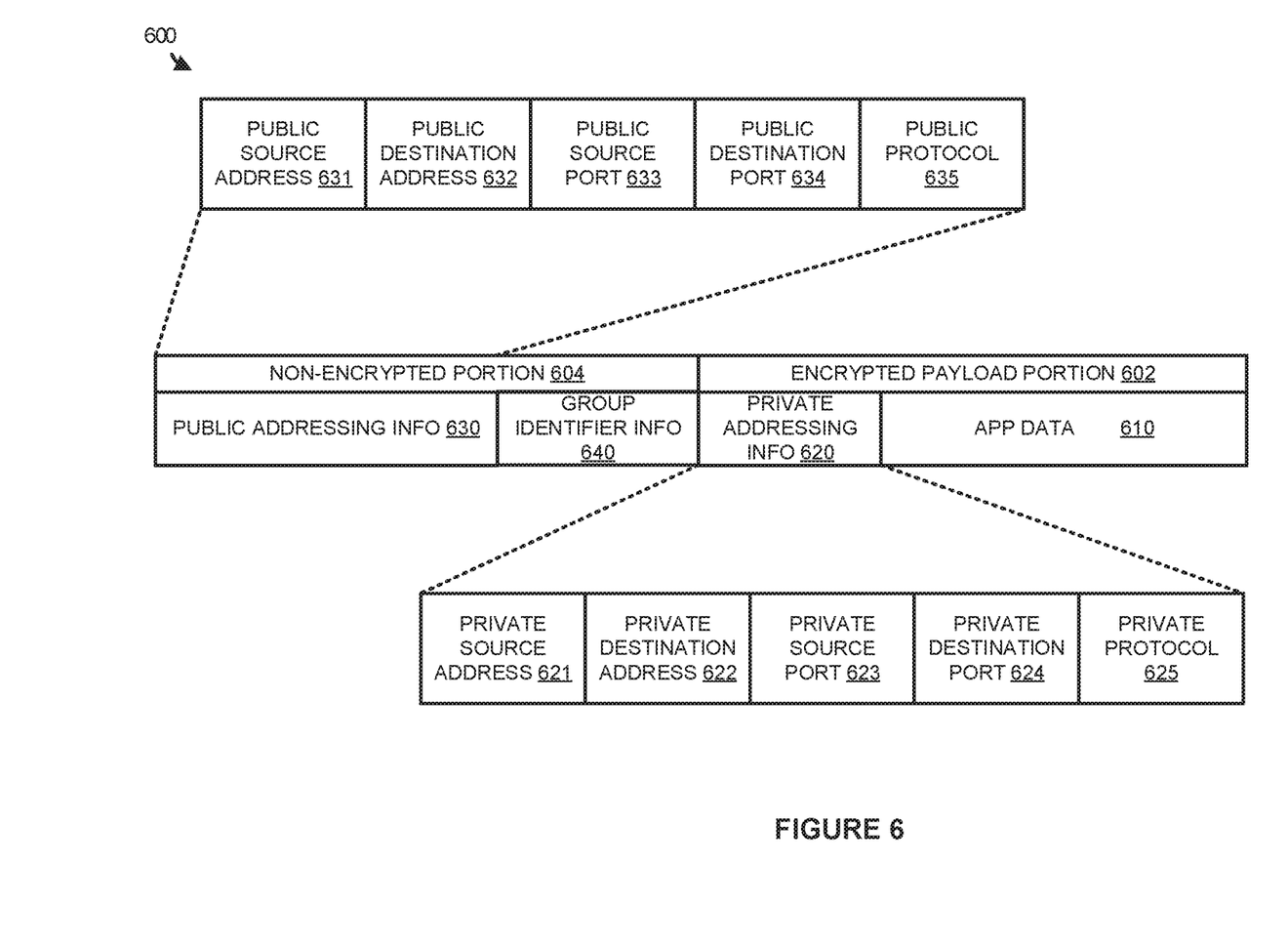
FIG. 6 illustrates a secured network packet according to an implementation.

FIG. 6 illustrates a secured network packet 600 according to an implementation. Network packet 600 includes an encrypted payload portion 602 and a non-encrypted portion 604. Encrypted payload portion includes application data 610 and private addressing information 620, while non-encrypted portion 604 includes group identifier information 640 and public addressing information 630.

As described herein, a communication service that operates as part of or alongside the operating system of a computing system, will identify a communication request for an application. Once identified and the communication is permitted, the communication service may generate network packet 600 using permissions information (addressing and encryption parameters) provided by a configuration system. In the present example, the communication includes the application data 610, which corresponds to the data requested to be transmitted by the application, private addressing information 620 that is used as overlay addressing for the application in communicating with other applications and computing systems that are part of the overlay network, group identifier information 640, which is used in decrypting and providing security information for the packet, and public addressing information 630, which is used in the routing of the communications on the underlay communication network.

First, with respect to private addressing information 620, private addressing information 620 comprises addressing that is allocated to applications on a computing system by a configuration service. For example, the configuration service may be used to allocate financial client computing system applications with access to communicate with a financial database application on a separate computing system. In allocating these permissions, the configuration system may assign the computing systems (and associated applications) private addressing information to join the private overlay network. Here, when an application attempts to communicate with a second application on another computing system, the private addressing will include private source address 621 associated with the source application, destination address 622 associated with the destination application, private source port 623 associated with the source application, private destination port 624 associated with the destination application, and a private protocol 625 that is used by the communication between the applications.

Second, packet 600 includes group identifier information 640, which is used by the destination computing system and, in some examples the gateway service, to identify group (overlay network and communication group) associated with the packet, and decrypt information for decrypting the packet. This information may include information about the length of the data payload, information about the sequence number of the packet, a keyed-hash message authentication code (HMAC), a peer identifier (peerID), an initialization vector (IV) or seed for encryption, or some other similar information, including combinations thereof.

Third, packet 600 includes public addressing information 630, which is used in the overlay network to direct the packet to the appropriate destination. In particular, public addressing information 630 includes at least public source address 631 corresponding to the source computing system, public destination address 632 corresponding to the destination service or system, public source port 633 corresponding to a port that is used by the source computing system for the communication service, public destination port 634 corresponding to a port that is used by the destination computing system or service, and public protocol 635 that corresponds to user datagram protocol, a transmission control protocol for communicating between computing systems. It should be understood that the information in public addressing information 630 differs from that used in private addressing information 620.

In some implementations, the public addressing information may be used to communicate with a gateway service that acts as an intermediary between the source computing system and the destination computing system of the communication group. This public addressing information may include a destination address associated with gateway service and a destination port value that is shared by multiple communication groups to address the gateway service. Once a packet is received, a translation process may be used to identify the appropriate communication group, modify the destination port value, and forward the packet to the associated service. Advantageously, rather than permitting each gateway for each communication group to open a port on the service, a single port may be opened that can then be forwarded to the appropriate gateway.

Figure 7:
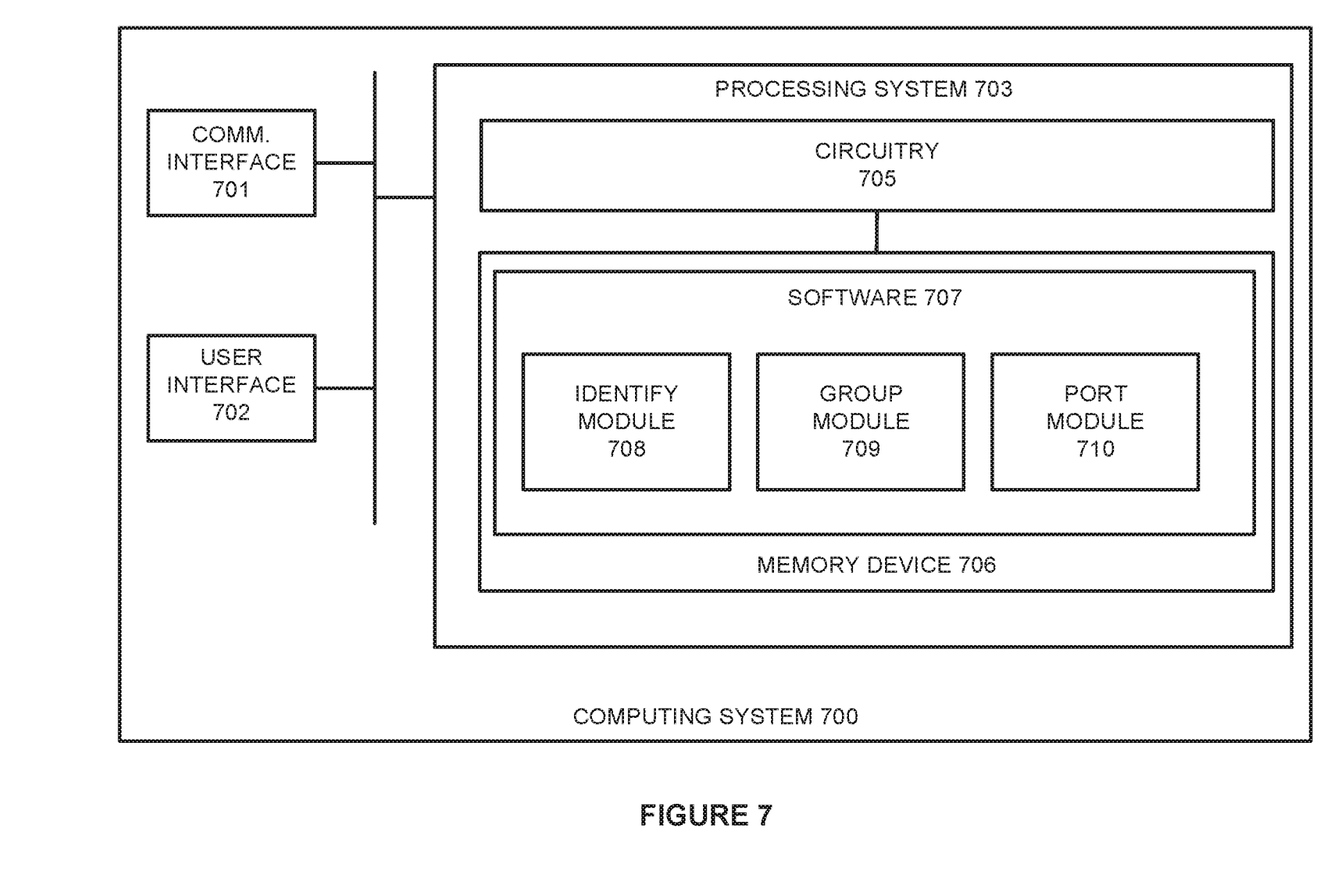
FIG. 7 illustrates a computing system capable of operating as a gateway service according to an implementation.

FIG. 7 illustrates a computing system 700 capable of operating as a gateway service according to an implementation. Computing system 700 is representative of any computing system or systems with which the various operational architectures, processes, scenarios, and sequences disclosed herein for a computing system with a communication service can be implemented. Computing system 700 is an example of gateway service 115, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with other end computing systems and a configuration system as described herein.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes identify module 708, group module 709, and port module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In operation, identify module 708, when read and executed by processing system 703, directs processing system 703 to identify a data packet received from a computing system, wherein the data packet comprises a first destination port value. In response to identifying the received packet, group module 709 directs processing system 703 to identify a group identifier within the data packet, wherein the group identifier associated with a communication group of the plurality of communication groups. Once the group identifier is determined, port module 710 directs processing system 703 to translate the first destination port value to a second destination port value based on the group identifier, and replace the first destination port value with the second destination port value in the data packet. After replacing the destination port, port module 710 directs processing system 703 to forward the data packet with the second destination port value to a gateway service associated with the communication group.

Returning to the elements of FIG. 1, computing systems 110-112 and gateway service 115 may each comprise communication interfaces, network interfaces, processing systems, computer systems, microprocessors, storage systems, storage media, or some other processing devices or software systems, and can be distributed among multiple devices. Computing systems 110-112 and gateway service 115 can each include software such as an operating system, logs, databases, utilities, drivers, natural language processing software, networking software, and other software stored on a computer-readable medium. Computing systems 110-112 and gateway service 115 may each comprise a serving computing system, a desktop computing system, or some other similar computing system. In some implementations, computing systems 110-112 and gateway service 115 may also represent virtual machines.

Network 160 comprises network elements that provide communication services to computing system. Network 160 may comprise real and virtual switches, wireless access nodes, Internet routers, network gateways, application servers, computer systems, communication links, or some other type of communication equipment—including combinations thereof.

Communication between computing systems 110-112 and gateway service 115 may use metal, glass, optical, air, space, or some other material as the transport media. Communication between computing systems 110-111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing systems 110-112 and gateway service 115 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
one or more computer non-transitory readable storage media;
a processing system communicatively coupled to the one or more non-transitory computer readable storage media; and
program instructions stored on the one or more non-transitory computer readable storage media to provide a gateway service for a plurality of communication groups that, when read and executed by the processing system, direct the processing system to at least:
identify a data packet received from a first computing system, wherein the data packet comprises a first destination port value;
identify a group identifier within the data packet, wherein the group identifier is associated with a communication group of the plurality of communication groups;
translate the first destination port value to a second destination port value based on the group identifier;
replace the first destination port value with the second destination port value in the data packet; and
forward the data packet with the second destination port value to a gateway associated with the communication group;
wherein the data packet comprises an encrypted portion and a non-encrypted portion, wherein the non-encrypted portion comprises at least the first destination port and the group identifier,
wherein the non-encrypted portion further includes supplemental decryption information to decrypt the encrypted portion of the data packet,
wherein the supplemental decryption information comprises an encrypted portion length, a sequence number for the network packet, a keyed-hash message authentication code (HMAC), a peer identifier (peerID), an initialization vector (IV) and a seed.

2. The computing apparatus of claim 1, wherein the program instructions further direct the processing system to execute a plurality of gateways each associated with a different communication group of the plurality of communication groups.

3. The computing apparatus of claim 1, wherein the encrypted portion comprises a data payload for an application on the first computing system and private addressing information for an overlay network associated with the application.

4. The computing apparatus of claim 3, wherein the private addressing information comprises a private destination internet protocol address associated with a destination application on a second computing system, and a destination port associated with the destination application.

5. The computing apparatus of claim 1, wherein the program instructions further direct the processing system to:
identify a second data packet received from a second computing system, wherein the second data packet comprises the first destination port value;
identify a second group identifier within the second data packet, wherein the second group identifier is associated with a second communication group of the plurality of communication groups;
translate the first destination port value to a third destination port value based on the group identifier;
replace the first destination port value with the third destination port value in the second data packet; and
forward the second data packet with the third destination port value to a second gateway associated with the communication group.

6. A method of operating a gateway service for a plurality of communication groups, the method comprising:
identifying a data packet received from a first computing system, wherein the data packet comprises a first destination port value;
identifying a group identifier within the data packet, wherein the group identifier is associated with a communication group of the plurality of communication groups;
translating the first destination port value to a second destination port value based on the group identifier;
replacing the first destination port value with the second destination port value in the data packet; and
forwarding the data packet with the second destination port value to a gateway associated with the communication group;
wherein the data packet comprises an encrypted portion and a non-encrypted portion, wherein the non-encrypted portion comprises at least the first destination port and the group identifier,
wherein the non-encrypted portion further includes supplemental decryption information to decrypt the encrypted portion of the data packet,
wherein the supplemental decryption information comprises an encrypted portion length, a sequence number for the network packet, a keyed-hash message authentication code (HMAC) peer identifier (peerID), an initialization vector (IV) and a seed.

7. The method of claim 6, further comprising executing a plurality of gateways each associated with a different communication group of the plurality of communication groups.

8. The method of claim 6, wherein the encrypted portion comprises a data payload for an application on the first computing system and private addressing information for an overlay network associated with the application.

9. The method of claim 8, wherein the private addressing information comprises a private destination internet protocol address associated with a destination application on a second computing system, and a destination port associated with the destination application.

10. The method of claim 6 further comprising:
identifying a second group identifier within the second data packet, wherein the second data packet comprises the first destination port value;
identifying a second group identifier within the second data packet, wherein the second group identifier is associated with a second communication group of the plurality of communication groups;
translating the first destination port value to a third destination port value based on the group identifier;
replacing the first destination port value with the third destination port value in the second data packet; and
forwarding the second data packet with the third destination port value to a second gateway associated with the communication group.

11. An apparatus comprising:
one or more computer non-transitory readable storage media; and
program instructions stored on the one or more non-transitory computer readable storage media to provide a gateway service for a plurality of communication groups that, when read and executed by a processing system, direct the processing system to at least:

identify a data packet received from a first computing system, wherein the data packet comprises a first destination port value;

identify a group identifier within the data packet, wherein the group identifier is associated with a communication group of the plurality of communication groups;

translate the first destination port value to a second destination port value based on the group identifier;

replace the first destination port value with the second destination port value in the data packet; and forward the data packet with the second destination port value to a gateway associated with the communication group;

wherein the data packet comprises an encrypted portion and a non-encrypted portion, wherein the non-encrypted portion comprises at least the first destination port and the group identifier, wherein the non-encrypted portion further includes supplemental decryption information to decrypt the encrypted portion of the data packet, wherein the supplemental decryption information comprises an encrypted portion length, a sequence number for the network packet, a keyed-hash message authentication code (HMAC), a peer identifier (peerID), an initialization vector (IV) and a seed.

* * * * *